United States Patent [19]

Stephens

[11] Patent Number: 4,845,630
[45] Date of Patent: Jul. 4, 1989

[54] METHOD AND APPARATUS FOR CALCULATING CORRECTED VEHICLE FUEL ECONOMY

[75] Inventor: Donald L. Stephens, La Conner, Wash.

[73] Assignee: Paccar Inc., Bellevue, Wash.

[21] Appl. No.: 29,271

[22] Filed: Mar. 23, 1987

[51] Int. Cl.$^4$ .............................................. G01F 9/00
[52] U.S. Cl. .................................... 364/442; 73/113; 73/114
[58] Field of Search .............. 73/112, 113, 114, 117.3; 364/442, 565, 424; 340/52 R

[56] References Cited

U.S. PATENT DOCUMENTS

| | | | |
|---|---|---|---|
| 1,595,960 | 8/1926 | Brown . | |
| 3,153,143 | 10/1964 | Fogarty . | |
| 3,686,935 | 8/1972 | May ........................................ | 73/112 |
| 3,908,451 | 9/1975 | Walker et al. ........................ | 73/114 |
| 4,050,295 | 9/1977 | Harvey ............................ | 364/442 X |
| 4,113,046 | 9/1978 | Arpino ............................ | 180/105 E |
| 4,129,034 | 12/1978 | Niles et al. .......................... | 73/117.3 |
| 4,173,887 | 11/1979 | Fiala ....................................... | 73/114 |
| 4,210,908 | 7/1980 | Sakakibara ......................... | 340/754 |
| 4,247,757 | 1/1981 | Crump, Jr. ........................... | 235/615 |
| 4,354,173 | 10/1982 | Kuhn et al. ........................ | 340/52 F |
| 4,475,380 | 10/1984 | Colovas et al. ................... | 73/112 X |
| 4,564,905 | 1/1986 | Masada et al. ................... | 364/442 X |
| 4,570,226 | 2/1986 | Aussedat ............................. | 364/442 |
| 4,647,902 | 3/1987 | Teshima et al. ................... | 340/52 R |

FOREIGN PATENT DOCUMENTS

| | | |
|---|---|---|
| 8927 | 3/1980 | European Pat. Off. . |
| WO83/01686 | 5/1983 | PCT Int'l Appl. . |
| 894760 | 12/1981 | U.S.S.R. . |
| 1472991 | 5/1977 | United Kingdom . |
| 2015739A | 9/1979 | United Kingdom . |
| 2052744A | 1/1981 | United Kingdom . |
| 2127545A | 4/1984 | United Kingdom . |
| 2150295A | 6/1985 | United Kingdom . |

*Primary Examiner*—Gary Chin
*Attorney, Agent, or Firm*—Seed and Berry

[57] ABSTRACT

A method and apparatus for calculating a corrected fuel economy rate. A fuel-consuming engine that propels a ground vehicle has at least one fuel rate sensor for measuring the fuel consumption rate of the engine. The apparatus further comprises a sensor for measuring the distance travelled by the ground vehicle. Digital counters accumulate pulse counts from the sensors and the pulse counts are processed by a microprocessor to calculate the distance travelled by the ground vehicle, the fuel consumed by the engine, and the change of the kinetic energy of the vehicle. The microprocessor then corrects the fuel consumed by subtracting the weighted change of the kinetic energy of the vehicle over the sampling period. The microprocessor then calculates the ratio of the distance travelled to the corrected fuel consumed to produce a corrected fuel economy rate, or its reciprocal. The ratio can be displayed on a digital display.

32 Claims, 4 Drawing Sheets

METHOD AND APPARATUS FOR CALCULATING CORRECTED VEHICLE FUEL ECONOMY

TECHNICAL FIELD

This invention relates generally to a method and apparatus for calculating the fuel economy of a vehicle and more particularly to a method and apparatus for calculating a fuel economy which is corrected for changes in the kinetic energy of the vehicle.

BACKGROUND OF THE INVENTION

Fuel economy is of great concern among operators of fleets of vehicles, particularly trucks used for hauling loads over a wide range of speeds on highways. The truck driver interested in maximizing fuel economy can be particularly aided by a continual display of the current fuel economy of the truck. The truck driver can use this information to develop and maintain driving habits which maximize fuel economy.

It has been known to use the manifold vacuum of an internal combustion engine propelling a vehicle to serve as an indicator of the fuel economy being achieved by that vehicle. Manifold vacuum is, however, a highly erratic variable and is dependent upon outside conditions such as atmospheric pressure. For these reasons, manifold vacuum does not provide an accurate or stable reading, greatly reducing its value as an indicator of engine fuel economy.

It has also long been known in the art to measure the engine fuel consumption rate and speed of the vehicle to calculate an instantaneous measure of fuel economy. These instantaneous measures of fuel economy are also highly erratic, but can be smoothed by means of electronic signal processing to produce a more stable and usable measure of fuel economy.

In U.S. Pat. No. 4,354,173, issued to Kuhn et al., an apparatus for indicating the fuel economy of a motor vehicle includes sensors for detecting engine speed, distances travelled by the vehicle, and the engine throttle. In addition, an accelerometer is coupled to the distance sensor to determine the vehicle acceleration. The signals from these sensors are combined to produce a signal indicative of the fuel economy of the vehicle and useful to alert the vehicle operator when, for example, the vehicle's transmission should be shifted.

In U.S. Pat. No. 4,113,046, Arpino discloses of a method and an apparatus for indicating the fuel economy of a vehicle during acceleration. The apparatus uses a throttle rate signal in combination with an acceleration signal to generate an efficiency signal. This efficiency signal drives an indicator to show whether the vehicle is accelerating efficiently. The efficiency signal can also be used in a vehicle speed control device to automatically control the acceleration of the vehicle.

The prior art does not disclose a fuel economy measurement system which accounts for changes in the fuel economy that are due to changes in the vehicle's kinetic energy as the vehicle acelerates or decelerates. Therefore, fuel economy indication systems that do not account for changes in the kinetic energy produce misleading signals whose behavior can be annoying to a driver who is attempting to maximize fuel economy.

The present invention provides an apparatus for correcting fuel economy measurements to account for changes in the kinetic energy og the vehicle. This apparatus is extremely simple and does not require sensors to measure throttle position, rate of change of throttle position, or vehicle acceleration.

DISCLOSURE OF THE INVENTION

The primary object of the invention is to provide a method and apparatus for calaulating a fuel economy measurement which is corrected for changes in the fuel consumption due to changes in the kinetic energy of the vehicle as the vehicle is accelerated or decelerated.

It is another object of the invention to provide a fuel economy measurement apparatus that calculates a fuel economy measurement that is a closer approximation to the true fuel economy of the vehicle.

It is still another object of the invention to provide a system that can display a fuel economy measurement that varies smoothly with accelerations and decelerations of the vehicle.

In general, the method of the present invention measures intervals of time, intervals of the distance travelled by the vehicle, and the fuel consumed by the vehicle's engine in an interval of time or distance. The method further comprises the steps of calculating a corrected fuel consumption of the engine over an interval of time or distance by subtracting a weighted difference of the kinetic energy of the vehicle at the end and the beginning of the interval of time or distance from the measured fuel consumption over the interval of time or distance. The method further cpmprises calculating a ratio of the distance travelled by the vehicle over the interval of time or distance to the corrected fuel consumption.

Since both fuel consumption (fuel used/distance traveled) and fuel economy (distance traveled/fuel used) are commonly used, and since these measures are reciprocally related, it can br seen that this invention applies to both.

The fuel economy measurement apparatus of the present invention comprises means for measuring intervals of time, means for measuring intervals of distance travelled by the ground vehicle, and means for measuring the fuel consumed by the engine in an interval of time or distance. The apparatus further comprises means for calculating a corrected fuel economy of the engine over the interval of time or distance by subtracting a weighted difference of the kinetic energy of the ground vehicle at the end and the beginning of the interval of time or distance from the measured fuel consumption over the interval of time or distance and for further calculating a ratio of the distance travelled by the ground vehicle over the interval of time or distance to the corrected fuel consu,ption, or its reciprocal. The means for calculating can be a microprocessor that is connected to a random access memory (RAM) and a read-only memory (ROM), such as an electrically programmable ROM (EPROM). In further embodiments, the present invention can further comprise a display device to present the corrected fuel economy rate to the truck driver.

BEST MODES FOR CARRYING OUT THE INVENTION

Figure 1:
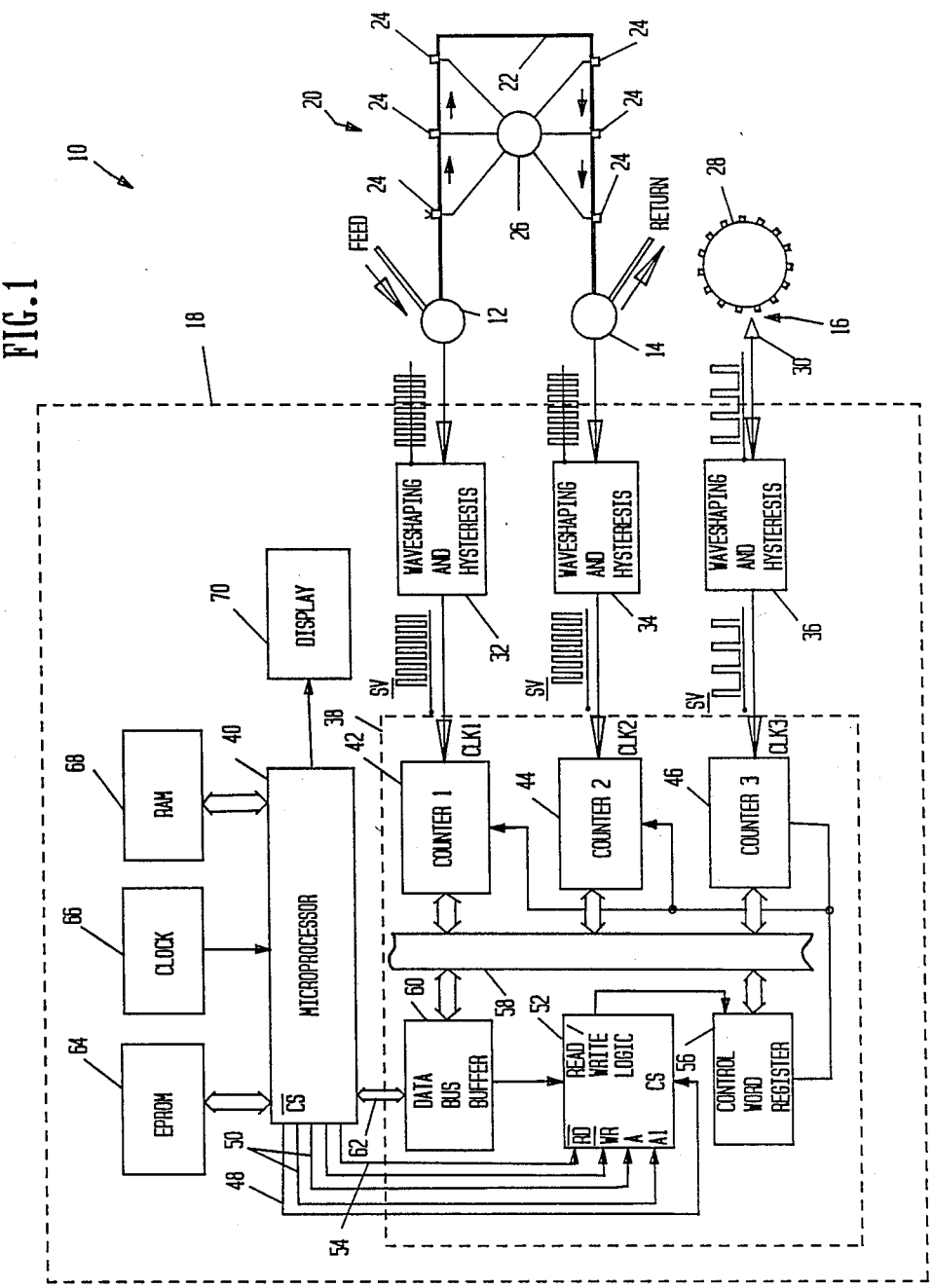
FIG. 1 is a schematic diagram of a preferred embodiment of the apparatus of the present invention.

One embodiment of the apparatus of the present invention is shown in FIG. 1. Corrected fuel economy apparatus 10 comprises fuel consumption sensors 12 and 14, incremental distance sensor 16, and circuitry 18. Fuel consumption sensors 12 and 14 are connected to the fuel system 20 of the engine propelling the vehicle and incremental distance sensor 16 is attached at a point on the vehicle where it can measure rotations of one of the vehicle's wheels. It is convenient to attach incremental distance sensor 16 to an axle driveshaft or transmission output shaft of the vehicle.

Fuel system 20 is schematically shown to be the injection system of a six cylinder diesel engine intended for use in heavy-duty trucks. Such an engine is built by the Caterpillar Co. The fuel system comprises a fuel supply circuit 22 that receives fuel under pressure from a fuel pump (not shown) that is connected to the vehicle's fuel tank (not shown). The fuel supply circuit is connected to fuel injectors 24 and returns the fuel to the fuel supply system. The directions of fuel flow in the fuel supply circuit are shown by arrows.

Fuel consumption sensors 12 and 14 are connected into fuel supply circuit 22 in order to measure the rate at which fuel is supplied to and returned from the the fuel supply circuit, respectively. The fuel consumption sensors can be FloScan fuel sensors that produce a pulsed signal in accordance with the volume of fuel passing through the sensor. The frequency of the pulses produced by the fuel consumption sensors is proportional to the rate at which the fuel is flowing through the sensors. For the application shown in FIG. 1, the fuel consumption sensors are chosen to produce approximately 48,000 pulses per gallon of fuel.

Approximately one-fourth to one-third of the fuel passing through fuel consumption sensor 12 does not return to pass through fuel consumption sensor 14. The amount of fuel being supplied to the engine is proportional to the difference between the frequencies of pulses produced by the two fuel consumption sensors.

In another diesel engine application, such as a Cummins engine, where a more nearly constant fraction of the fuel supplied to the fuel supply circuit is injected, an accurate measure of the fuel consumed by the engine can be obtained by monitoring the frequency produced by fuel consumption sensor 12. Accordingly, fuel consumption sensor 14 can be dispensed with in such applications, and the fuel returning from the fuel supply circuit can be returned to the fuel supply system along the "return" line. If only fuel consumption sensor 12 is to be used, the flow sensor can be chosen to produce fewer (e.g., 19200) pulses per gallon of fuel. At typical idle fuel delivery rates, this single flow sensor will produce approximately 40 pulses per second.

In other diesel applications, such as electronically controlled injection engines, the engine electronic controller can supply a signal that measures fuel flow.

In still other internal-combustion engine applications, such as a spark-ignited engine, the fuel consumed by the engine can be determined by the fuel flow to the fuel system, such as a carburetor.

Incremental distance sensor 16, being attached to measure the rotations of a wheel of the vehicle, can comprise a toothed wheel 28 and a magnetic sensor 30 for producing a pulse each time a tooth of the toothed wheel passes the magnetic sensor.

Circuitry 18 contains signal processing circuitry, a circuit for counting the pulses produced by the fuel consumption and incremental distance sensors, a microprocessor for performing the required calculations, and memory and a clock to serve the microprocessor. Signal conditioning circuits 32–36 receive the pulsed signals produced by sensors 12–16, respectively, and produce pulsed signals at the same respective frequencies. These pulsed signals are sent to a programmable timer/counter 38 which, under the control of microprocessor 40, accumulates pulse counts. The programmable timer/counter can, for example, be an Intel 8254, which contains three identical 16-bit timer/counters 42–46. Each counter can count, independently of the others, from 0 to 65535. Counters 42–46 are operated to accumulate the count of pulses respectively received from signal consitioning circuits 32–36. When microprocessor 40, which can be an Intel 8031, attempts to read the contents of one of the counters, the signal on the chip select line 48 is set to a logic "0" and an appropriate address is sent over address lines 50 to read/write logic 52. When it desires to read the designated counter, the microprocessor sets read line 54 to a logic "0" state, thereby sending a signal to control word register 56. Signals from the control word register cause the counter designated by address lines 56 to load its current count into a special register. This count data is then transferred via internal bus 58 to data bus buffer 60, and then to the microprocessor over 8-bit data bus 62. The 16-bit count read from the designated counter must be transferred to the microprocessor in two 8-bit bytes.

Microprocessor 40 is also connected to a read-only memory (ROM) 64, a clock 66, and a random access memory (RAM) 68. ROM 64 can be, for example, an electrically programmable ROM (EPROM). The ROM contains the program for controlling the microprocessor and the RAM is used to store data generated and required by the program. Microprocessor 40 and ROM 64 can be replaced by a microcontroller, which can be programmed to serve the same function. Accordingly, the microcontroller can be regarded as an equivalent of the combination of microprocessor 40 and ROM 64. Finally, the microprocessor drives display device 70 which displays the corrected fuel economy calculated by the microprocessor. The corrected value displayed by display device 70 can be the average of the corrected fuel economy over a period of time, for example, 5 seconds. Other averaging schemes to prevent erratic readings will be apparent to those skilled in the art.

The calculations performed by microprocessor 40 on the data provided by sensors 12–16 correct the fuel consumed by the engine to account for that fraction of the "fuel" consumed which is converted to or from kinetic energy. The fuel consumed by the engine when the vehicle is travilling at a constant speed is an exact measure of the energy required to move the vehicle along the highway at that speed. If, however, the vehicle accelerates, some of the energy produced by the consumption of fuel is converted to the form of kinetic energy. It is "stored" in this form and can later be used to move the vehicle along the highway. Subtracting the quantity of fuel that corresponds to the kinetic energy "stored" from the total fuel consumed leaves only the fuel consumed in moving the vehicle down the highway. If the sensors are read periodically by microprocessor 40, the change in kinetic energy is measured by the difference between the squares of the speeds measured at the most recent sample and the next most recent sample. The difference between the squares of the successive samples of the velocity must be multiplied by half the mass of the vehicle in order to dimensionally convert the difference to a kinetic energy difference. The mass (or, equivalently, the weight) of the vehicle must be known to the same order of accuracy as the desired correction.

Other methods of calculation may produce the same result. For example, the difference of velocities over the measured distance divided by the elapsed time, $(V_1-V_2)/t$, gives the average acceleration. Multiplying by the mass gives $M(V_1-V_2)/t$, the average force to accelerate the vehicle. Multiplying this by the average velocity, $(V_1+V_2)/2$, gives $M(V_1-V_2)(V_1+V_2)/2t$, the power needed to produce the acceleration, and multiplying this by the elapsed time t gives $M(V_1-V_2)(V_1+V_2)/2$, the energy needed. If these factors are multiplied, the result is $MV_1^2/2 - MV_2^2/2$, which is obviously the difference on kinetic energies over the distance traveled.

The weighting factor that should be applied to the change in the kinetic energy must increase the kinetic energy change to account for the fuel that would be used at real engine and drive train efficiencies to propel the vehicle if, for example, the kinetic energy were not available during coasting. It must also convert the energy value to an equivalent weight of fuel. The required factor is: (fuel consumption/unit change of kinetic energy). This correction factor can be calculated as a function of vehicle speed and weight and stored as a table in ROM 64.

Figure 2A:
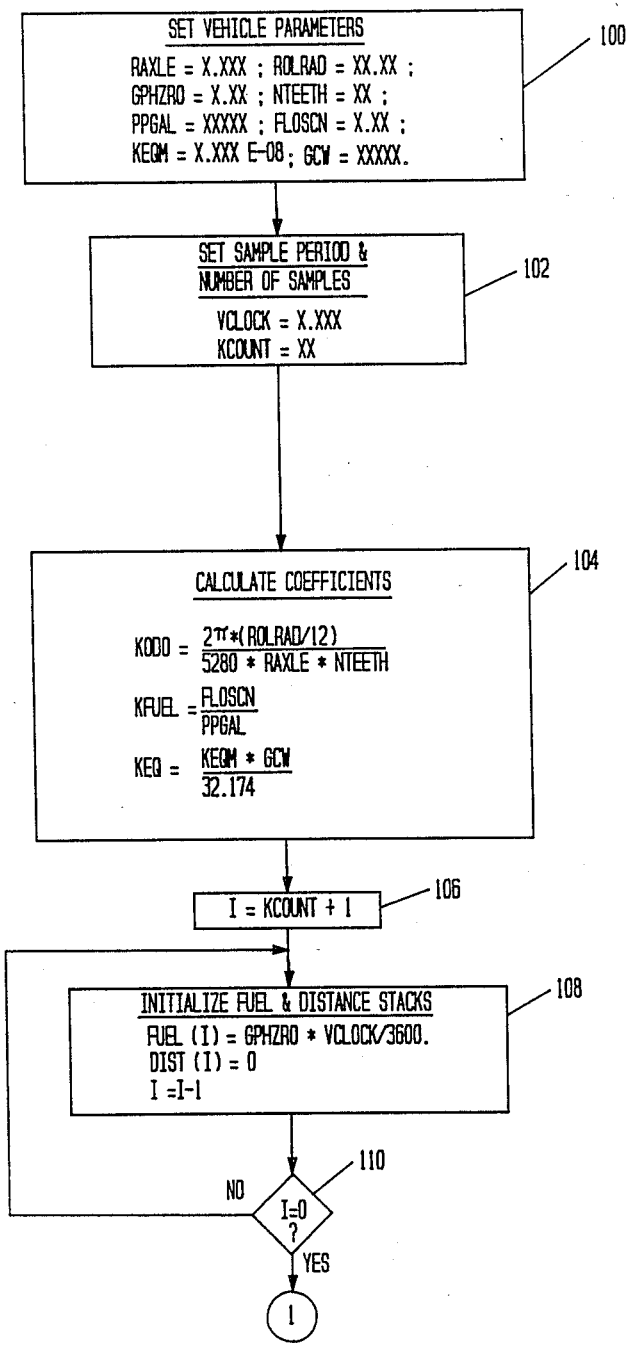
FIGS. 2A–2C are a block diagram of a computer program that operates with the apparatus shown in FIG. 1.
Figure 2B:
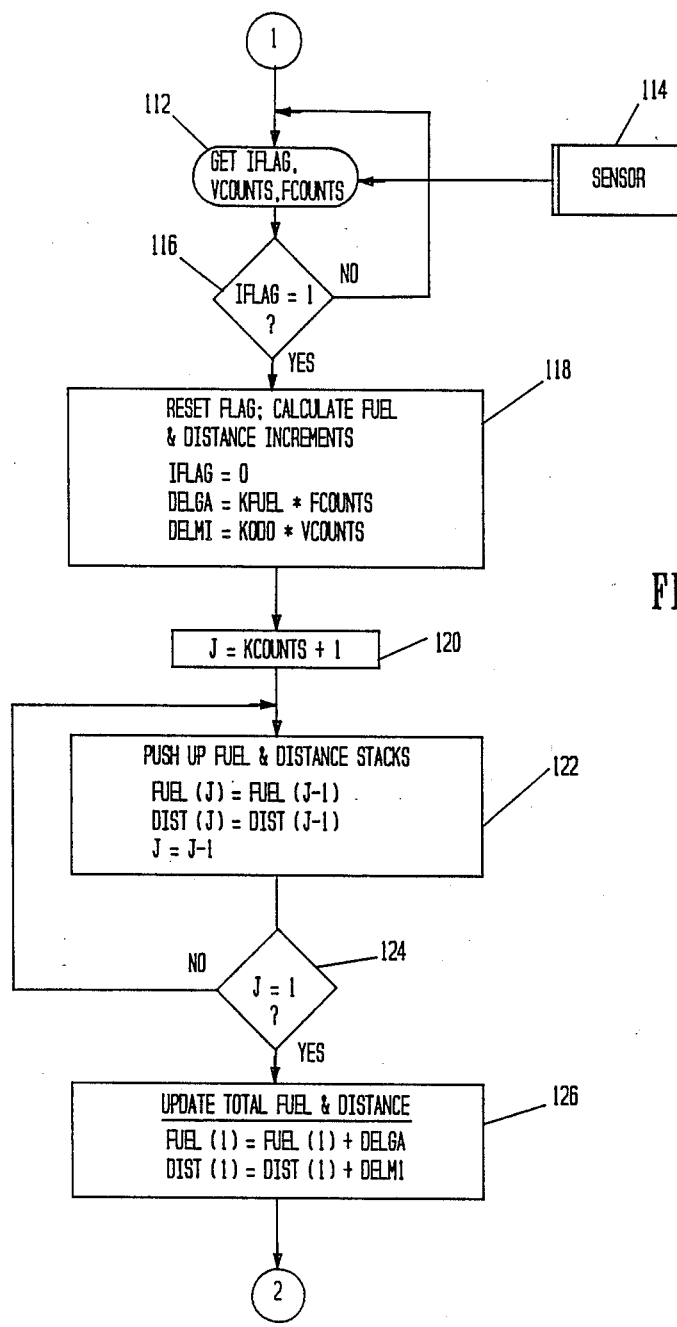
Figure 2C:
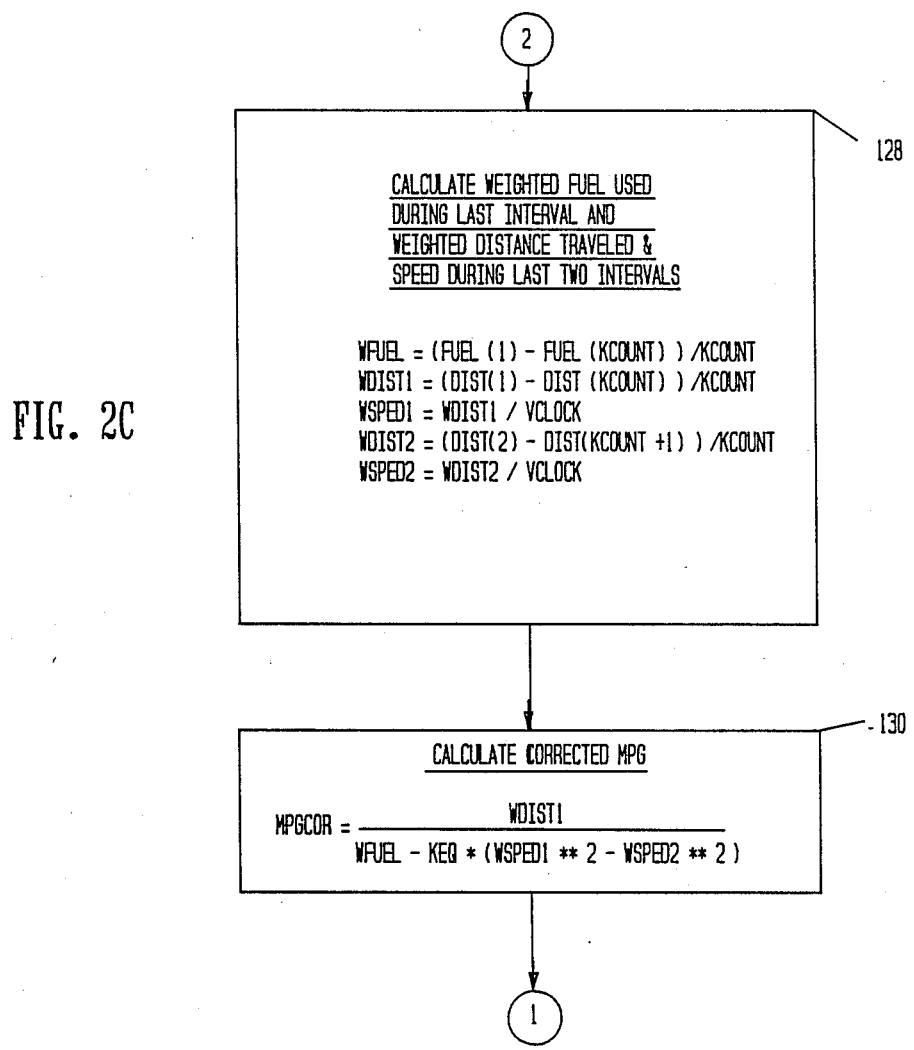

Turning now to FIG. 2A-2C, the operation of one version of a computer program for microprocessor 40 (in FIG. 1) will be described. The purpose of these calculations is to compute the corrected fuel consumption rate given by the formula:

$$\text{Corrected Fuel Economy} = \frac{\text{distance travelled}}{(\text{fuel consumed}) - Keq(V1^2 - V2^2)}$$

where Keq is the weighting factor times half the vehicle mass and V1 and V2 are speeds at the end and beginning of the distance travelled, respectively.

In initialization of block 100, quantities are ascribed to certain vehicle parameters. These include the axle radius (RAXLE), the rolling radius of the vehicle's tires (ROLRAD), an initial estimate of the time rate of fuel consumption (GPHZRO), the number of teeth on the toothed wheel of the distance increment sensor (NTEETH), the number of pulses per gallon produced by the fuel consumption sensor (PPGAL), the fuel burn ratio of the engine's fuel system (FLOSCR), the fuel equivalent for change in kinetic energy per unit vehicle mass (KEQm), and the gross combined vehicle weight (GCW). Many of these variables may be reset in value. For example, the gross combined vehicle weight value is resettable by the operator.

In sample period initialization block 102, the sample period of the distance increment and fuel sensors and the number of samples used in the weighting calculations for fuel and distance are specified. For a particular type of vehicle, the parameters initialized in blocks 100 and 102 can be stored in ROM 64 (FIG. 1). In block 104, the program calculates conversion factors for the odometer, the fuel sensor, and the change from vehicle kinetic energy to equivalent fuel. These conversion factors involve the vehicle parameters that were established in block 100.

Blocks 106, 108, and 110 form a logic loop for initializing the fuel and distance arrays which are stored in the RAM. The first KCOUNT entries in the FUEL and DIST arrays are initialized. The FUEL array is initialized to a value equal to the amount of fuel burned at the estimated initializing fuel burn rate in a single sample period. The DIST array is initialized to zero.

The logic loop comprising blocks 112 and 116 and subroutine SENSOR 114 is iterated, with block 112 receiving the outputs produced by subroutine SENSOR 114. Subroutine SENSOR produces values of IFLAG, VCOUNTS, and FCOUNTS. IFLAG is held at zero until VCLOCK seconds have elapsed. At this point, IFLAG is set equal to 1 and the values of VCOUNTS and FCOUNTS are stored in memory. VCOUNTS and FCOUNTS respectively record the number of pulses produced by the incremental distance sensor and by the fuel sensor during the sample period of VCLOCK seconds. After the value of IFLAG has been set equal to 1, decision block 116 allows the program to progress to block 118, which resets the value of IFLAG and calculates the incremental number of gallons and miles that were produced in the last VCLOCK seconds. These incremental values are produced by multiplying the coefficients KFUEL and KODO by the values of FCOUNTS and VCOUNTS, respectively. Blocks 120-124 form a logic loop which pushes each of the values in the FUEL and DIST arrays up by one position.

The program escapes from this loop when all current values in the arrays have been pushed up by one position and the program then enters block 126. Block 126 adds the latest incremental amount of fuel consumed and distance travelled to the previous accumulated FUEL and DIST values, respectively. The samples in the FUEL and DIST arrays are taken VCLOCK seconds apart.

Control passes next to block 128 where the fuel consumed over the last KCOUNT - 1 sampling periods (WFUEL) and the distance travelled over the last KCOUNT - 1 sampling periods (VDIST1) is calculated. In addition, two pairs of distance and speed variables are calculated in block 128. One weighted distance (WDIST1), the distance covered over the last KCOUNT - 1 sampling periods, is divided by the number of samples and the weighted speed over the last KCOUNT - 1 sampling periods is calculated by dividing WDIST1 by the duration of a single sampling period. Similarly, another weighted distance variable (WDIST2) is calculated over the next most recent KCOUNT - 1 sampling periods and normalized by the number of periods. WSPED2 is calculated by dividing the average distance travelled in each sampling period of the next KCOUNT - 1 most recent sampling preiods by the number of seconds in each sampling period to produce a speed. Control then passes to block 130.

In block 130 the corrected fuel economy rate is computed by dividing the most recent per-sampling period distance covered over the last KCOUNT - 1 sampling periods by the difference between the per-sampling interval average of fuel used in the last kcount - 1 sampling intervals and the weighted difference between the squares of the two speed variables calvulated in block 128. This is the value that is then converted by microprocessor 40 and displayed on display 70 (FIG. 1). Control of the program then returns to the logic loop formed by blocks 112 and 116 and subroutine SENSOR 114. This logic loop collects a new set of VCOUNTs and FCOUNTs and uses these data to update the corrected fuel economy rate, MPGCOR.

If the program whose block diagram is shown in FIGS. 2A-2C is intended to be used with an engine requiring only a single fuel consumption sensor (see FIG. 1), e.g., a Cummins engine, the value of FCOUNTS can be read directly from counter 42 which is connected to fuel consumption sensor 12 through signal conditioning circuit 32. If, on the other hand, the engine requires both fuel consumption sensors 12 and 14, FCOUNTS will be calculated by microprocessor 40 as the difference between the counts read from counters 42 and 44.

While the computer program described by the flow chart in FIGS. 2A-2C relies on samples taken over sampling periods that have a fixed time duration, one skilled in the art will appreciate that a computer program for microprocessor 40 in FIG. 1 could alternatively sample the time and distance variables as functions of fixed increments in distance. In this latter case, the independent variable for the calculations is distance rather than the more conventionally used time variable.

Various averaging methods are well known to those skilled in the art and are frequently used on display devices for such purposes as smothing or quickening the response, or for minimizing the effect of inherent errors such as are encountered with digital data. These methods may be used in this device. Clearly, their use or non-use is not germane to the essence of the invention, which is the accounting for vehicle kinetic energy in the claculation of vehicle fuel efficiency.

I claim:

1. A vehicle fuel economy meter for adjusting the value of a distance traveled by the vehicle per unit of fuel consumed by the vehicle, including means for measuring the speed of the vehicle during a measurement period, means for measuring the change of kinetic energy of the vehicle from measured speeds of the vehicle, and electronic circuitry for adjusting the value in which the value is increased by the change of kinetic energy of the vehicle during the measurement period when the vehicle speed is increasing from a lower value to a higher value, and correspondingly decreased during the measurement period when the vehicle speed is decreasing from a higher value to a lower value.

2. A vehicle fuel economy meter for adjusting the value of a distance traveled by the vehicle per unit of fuel consumed by the vehicle, including means for measuring the speed of the vehicle during a measurement period, means for measuring the change of kinetic energy of the vehicle from measured speeds of the vehicle, and electronic circuitry for adjusting the value in which the consumed fuel equivalent of the change of vehicle kinetic energy in the distance traveled is a fuel decreasing factor in the calculation of the distance traveled per unit of fuel consumed for an increasing vehicle speed from a lower value to a higher value and in which the consumed fuel equivalent of the change of vehicle kinetic energy in the distence traveled is fuel increasing factor in the calculation of distance traveled per unit of fuel consumed for a decreasing vehicle speed from a higher value to a lower value.

3. A fuel economy measurement apparatus for use in a ground vehicle propelled by an engine that consumes a fuel, comprising:

means for producing signals that measure a predetermined interval of time, the interval having a beginning and an end;
means for producing signals that measure a distance traveled by the vehicle in the interval of time;
means for producing signals that measure the fuel consimed by the engine in the interval of time; and
means for receiving the time interval, distance traveled and fuel consumption signals and calculating a corrected fuel consumption of the engine in the interval of time by subtracting a weighted difference of the kinetic energies of the ground vehicle at the end and at the beginning of the interval of time from the measured fuel consumed in the interval of time, and for calculating a value of a ratio of the distance traveled by the ground vehicle in the interval of time and the corrected fuel consumption.

4. The fuel economy measurement apparatus of claim 3 wherein the means for calculating is a microprocessor.

5. The apparatus of claim 4, further comprising read-only memory (ROM) for storing a program for the microprocessor and random-access memory (RAM) for storing one or more values of data generated by the program, wherein the ROM and RAM are connected to the microprocessor.

6. The fuel economy measurement apparatus of claim 5 wherein the microprocessor calculates the difference of the kinetic energies of the ground vehicle at the end and the beginning of the interval of time, based on stored values of the measured fuel consumption rate over the interval of time.

7. A fuel economy measurement apparatus for use in a ground vehicle, propelled by an engine that consumes a fuel, comprising:

means for producing signals that measure a predetermined interval of time, the interval having a beginning and an end;
means for producing signals that measure a distance traveled by the ground vehicle in the interval of time;
means for producing signals that measure the fuel consumed by the engine in the interval of time;
a microprocessor for receiving the time interval, distance travelled, and fuel consumption signals and calculating a corrected fuel consumption of the engine in the interval of time by subtracting a weighted difference of the kinetic energies of the ground vehicle at the end and the beginning of the interval of time from the measured fuel consumed in the interval of time, and for calculating a value of a ratio of the distance traveled by the ground behicle in the interval of time and the corrected fuel consumption; and
means for displaying the value of the ratio.

8. The fuel economy measurement apparatus of claim 7 wherein the display means is a digital display.

9. A method of measuring a corrected fuel economy rate of a fuel-consuming engine in a ground vehicle, the method comprising the steps of:

(A) producing signals that measure a predetermined interval of time, the interval having a beginning and an end;
(B) producing signals that measure a distance traveled by the ground vehicle in the interval of time;
(C) producing signals that measure the fuel consumed by the engine in the interval of time;
(D) receiving the time interval, distance traveled, and fuel consumption signals and calculating the kinetic energy of the ground vehicle at the end and at the beginning of the time interval;

(E) calculating a corrected fuel consumption of the engine in the interval of time by subtracting a weighted difference of the kinetic energies. of the ground vehicle at the end and at the beginning of the interval of time from the measured fuel consumption in the interval of time; and (F) calculating a value of a ratio of the corrected fuel consumption and the distance traveled by the ground vehicle in the interval of time.

10. The method of claim 9, further comprising the step of displaying the calculated ratio.

11. A fuel economy measurement apparatus for use in a ground vehicle propelled by an engine that consumes a fuel, comprising:
means for producing signals that measure a predetermined interval of distance traveled by the ground vehicle, the interval having a beginning and an end;
means for producing signals that measure the fuel consumed by the engine in the interval of distance; and
means for receiving signals that measure the predetermined interval of distance traveled by the ground vehicle and the signals that measure the fuel consumed by the engine in the interval of distance and calculating a corrected fuel consumption of the engine in the interval of distance by subtracting a weighted difference of the kinetic energies of the ground vehicle at the end and at the beginning of the interval of distance from the measured fuel consumed in the interval of distance, and for calculating a value of a ratio of the interval of the distance traveled by the ground vehicle and the corrected fuel consumption.

12. The fuel economy measurement apparatus of claim 11 wherein the signal-receiving and calculating means is a microprocessor.

13. The apparatus oflaim 12, further comprising read-only memory (ROM) for storing a program for the microprocessor and random-access memory (RAM) for storing one or more values of data generated by the program, the ROM and RAM being connected to the microprocessor.

14. The fuel economy measurement apparatus of claim 13 wherein the RAM stored values of the measured fuel consumed in the interval of distance and said microprocessor calculates the difference of the kinetic energies of the ground vehicle at the end and at the beginning of the interval of distance, based on the values stored in the RAM.

15. A fuel economy measurement apparatus for use in a ground vehicle propelled by an engine that consumes a fuel, comprising:
means for producing signals that measure an interval of distance traveled by the ground vehicle in a predetermined interval of time, the interval of distance having a beginning and an end;
means for producing signals that measure the fuel consumed by the engine in the predetermined interval of time;
a microprocessor for receiving signals that measure the predetermined interval of distance traveled by the ground vehicle and the signals that measure the fuel consumed by the engine in the interval of distance and calculating a corrected fuel consumption of the engine in the predetermined interval of time by subtracting a weighted difference of the kinetic energies of the ground vehicle at the end and at the beginning of the interval of distance from the measured fuel consumed in the interval of distance, and for calculating a value of a ratio of the interval of distance and the corrected fuel cinsumption; and
means for displaying the ratio.

16. The fuel economy measurement apparatus of claim 15 wherein the display means is a digital display.

17. A method of measuring a corrected fuel economy rate of a fuel-consuming engine in a ground vehicle, the method comprising the steps of:
(A) producing signals that measure an interval of distance traveled by the ground vehicle in a predetermined interval of time, the interval of time having a beginning and an end;
(B) producing signals that measure the kinetic energy of the vehicle at the beginning and at the end of the interval of time;
(C) measuring the fuel consumed by the engine in the interval of time to produce a measured fuel consumption rate;
(D) calculating a corrected fuel consumption rate of the engine in the interval of distance by substracting a weighted difference of the kinetic energies of the ground vehicle at the end and at the beginning of the interval of time from the measured fuel consumption rate over the interval of time; and
(E) calculating a value of a ratio of the corrected fuel consumption rate and the interval of distance.

18. The method of claim 17, further comprising the step of displaying the ratio.

19. A vehicle fuel economy meter for adjusting the value of the fuel consumed by the vehicle per unit of distance traveled by the vehicle, including means for measuring the speed of the vehicle during a measurement period, means for measuring the change of kinetic energy of the vehicle from measured speeds of the vehicle, and electronic circuitry for adjusting the value in which the value is decreased by the change of kinetic energy of the vehicle during the measurement period when the vehicle speed is increasing from a lower value to a high value, and correspondingly increased during the measurement period when the vehicle speed is decreasing from a higher value to a lower value.

20. A vehicle fuel economy meter for adjusting the value of the consumed by the vehicle per unit of distance traveled by the vehicle, including means for measuring the speed of the vehicle during a measurement period, means for measuring the change of kinetic energy of the vehicle from measured speeds of the vehicle, and electronic circuitry for adjusting the value in which the consumed fuel equivalent of the change of vehicle kinetic energy in the distance traveled is a fuel decreasing factor in the calculation of the fuel consumed per unit of distance traveled for an increasing vehicle speed from a lower value to a higher value, and in which the consumed fuel equivalent of the change of vehicle kinetic energy in the distance traveled is a fuel increasing factor in the calculation of distance traveled per unit of fuel consumed for a decreasing vehicle speed from a higher value to a lower value.

21. A method for measuring fuel economy in a ground vehicle propelled by an engine that consumes a fuel, comprising the steps of:
(A) measuring a distance interval traveled by the vehicle;
(B) measuring the fuel consumed by the vehicle in the distance interval;

(C) generating a value corresponding to a change in kinetic energy of the vehicle in the distance interval; and (D) calculating a fuel economy value based on the fuel consumed by the vehicle and said value corresponding to the change in kinetic energy of the vehicle.

22. The method of claim 21, further comprising the step of displaying the fuel economy value.

23. A method for measuring fuel economy in a ground vehicle propelled by an engine that consumes a fuel, comprising the steps of:

(A) measuring the fuel consumed by the vehicle in a time interval;

(B) generating a value corresponding to a change in kinetic energy of the vehicle in the time interval; and (C) calculating a fuel economy value based on the fuel consumed by the vehicle and said value corresponding to the change in kinetic energy of the vehicle.

24. The method of claim 23, further comprising the step of displaying the fuel economy value.

25. A fuel economy measurement apparatus for use in a ground vehicle propelled by an engine that consumes a fuel, comprising:

means for measuring a distance interval traveled by the vehicle;

means for measuring the fuel consumed by the vehicle in the distance interval;

means for generating a value corresponding to a change in kinetic energy of the vehicle in the distance interval; and means for calculating a fuel economy value based on the fuel consumed by the vehicle and said value corresponding to the change in kinetic energy of the vehicle.

26. The fuel economy measurement apparatus of claim 25, further comprising means for displaying the fuel economy value.

27. A fuel economy measurement apparatus for use in a ground vehicle propelled by an engine that consumes a fuel, comprising:

means for measuring the fuel consumed by the vehicle in a time interval;

means for generating a value corresponding to a change in kinetic energy of the vehicle in the time interval; and means for calculating a fuel economy value based on the fuel consumed by the vehicle and said value corresponding to the change in kinetic energy of the vehicle.

28. The fuel economy measurement apparatus of claim 27, further comprising means for displaying the fuel economy value.

29. A fuel economy display and measuring apparatus for a vehicel, comprising:

a fuel sensor for measuring the amount of fuel consumed by said vehicle in a predetermined time period;

a distance sensor for measuring a distance traveled by said vehicle in said predetermined time period;

an electronic circuit for determining a measured fuel economy value based on said fuel consumed and said distance traveled;

means for determining changes in said vehicle's kinetic energy in said predetermined time period;

an electronic circuit foe generating a modified fuel economy value based on said changes in said vehicle's kinetic energy and said measured fuel economy value; and a visual display for displaying said modified fuel economy value.

30. The apparatus according to claim 29 wherein said means for determining changes in said vehicle's kinetic energy includes means for inputting said vehicle's mass.

31. The apparatus according to claim 29 wherein said electronic circuit for generating said modified value includes means for modifying said measured fuel consumed.

32. The apparatus according to claim 29 wherein said electronic circuit for generating said modified value includes means for modifying siad measured distance traveled.

* * * * *